Figure 1:
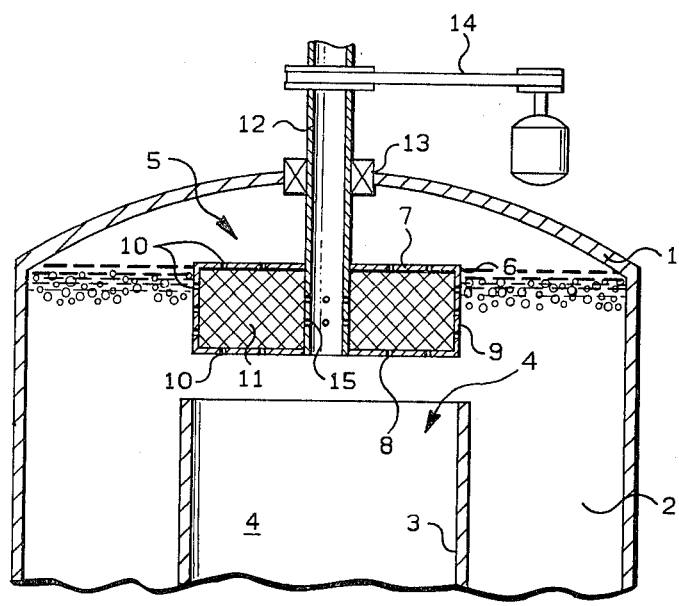

United States Patent [19]

Hunt

[11] 4,373,024
[45] Feb. 8, 1983

[54] APPARATUS USEFUL FOR FOAM BREAKING

[75] Inventor: Harold R. Hunt, Bartlesville, Okla.

[73] Assignee: Phillips Petroleum Company, Bartlesville, Okla.

[21] Appl. No.: 212,187

[22] Filed: Dec. 2, 1980

[51] Int. Cl.³ .............................................. B01D 19/02
[52] U.S. Cl. ........................................ 435/41; 55/87; 55/178; 252/361; 435/314; 435/315; 435/812
[58] Field of Search ........................... 55/87, 178, 400; 210/393; 435/313, 314, 315, 316, 41, 812; 252/361

[56] References Cited

U.S. PATENT DOCUMENTS

| | | | |
|---|---|---|---|
| 1,580,380 | 4/1926 | MacDonald | 55/400 |
| 1,609,413 | 12/1926 | Kristoffersson | 55/400 |
| 2,405,138 | 8/1946 | Gates et al. | 55/400 |
| 2,564,765 | 8/1951 | Mercier | 55/400 |
| 2,610,155 | 9/1952 | Humfeld et al. | 55/400 |
| 3,649,557 | 3/1972 | Freedman et al. | 55/87 |
| 3,945,922 | 3/1976 | Jagusch | 55/87 |
| 3,960,525 | 6/1976 | Coins | 55/178 |
| 4,239,626 | 12/1980 | Vamvakas | 210/393 |
| 4,256,582 | 3/1981 | Ducasse | 210/393 |

Primary Examiner—Ivars C. Cintins

[57] ABSTRACT

An apparatus useful for foam breaking operations and particularly useful for fermentation processes is described having a foam breaking body wherein the foam breaking surfaces are created by a multitude of elements arranged in contact with each other and defining a multitude of paths for the foam and fluids there through. This body is arranged for rotation and the gas phase is withdrawn from said body at or near the rotational axis.

10 Claims, 1 Drawing Figure

APPARATUS USEFUL FOR FOAM BREAKING

This invention relates to a foam breaking process and an apparatus which can be used for foam breaking. More specifically, the invention relates to a process in which a foam following a pressure gradient is passed through moving surfaces to separate the liquid and the gas.

BACKGROUND OF THE INVENTION

In a variety of technologies foams are generated in one step and have to be broken in a further step. Such foams usually consist of a continuous liquid phase with small gas bubbles entrapped therein. Generally, the separation becomes more difficult the smaller the bubbles are.

In the fermentation art foam breakers have become widely known which comprise a plurality of frustoconically shaped surfaces coaxially arranged with a constant distance between them. These surfaces, when put into rapid rotation, cause the foam to be broken apart with the heavier liquid leaving the foam breaker at its circumference whereas the gas is withdrawn from an axial central conduit. It is a continuing goal in the industry to provide apparatus and processes allowing to carry out a foam breaking step in an efficient and economically more feasible manner than heretofore possible.

THE INVENTION

It is one object of this invention to provide a new apparatus that can be used for foam breaking and is simple in construction.

Another object of this invention is to provide an apparatus useful for foam breaking operations that can be adapted to varying foam compositions.

A further object of this invention is to provide a process for breaking a fermentation foam.

These and other objects, advantages, details, features and embodiments of this invention will become apparent to those skilled in the art from the following detailed description of the invention, the appended claims and the drawing which shows a schematic cross section through an apparatus in accordance with this invention.

The apparatus of this invention comprises as its main feature a rotatably arranged foam breaking body of a specific structure. This foam breaking body comprises a plurality of elements which are in contact with each other leaving a multitude of fluid paths in this body. These fluid paths provide fluid connections between an outer and an inner surface. The terms "outer" and "inner" refer to an axis of rotation in the sense that the inner surface is closer to this axis of rotation than the outer surface. The foam breaking body is arranged for rotation around this axis. When a pressure gradient is generated between the outer and the inner surface a foam present at the outer surface will move toward the inner surface. The rotation of the foam breaking body will cause the liquid to follow the stronger centrifugal forces and move along the paths toward the outer surface whereas the gas will move toward the inner surface following the pressure gradient and thus separating the liquid phase and the gas phase. The moving surfaces of the individual elements contacting the foam together with the forces described cause a foam breaking effect.

Thus, in accordance with a first embodiment of this invention, an apparatus useful for breaking foam is provided. This apparatus comprises housing which can hold foam and a foam breaking body. This foam breaking body comprises a plurality of elements arranged in contact with each other. These elements are of such a structure and arrangement as to lead a multitude of fluid paths in the body. These paths provide fluid connections between an outer and an inner surface. The outer surface of the body is in fluid communication with the interior of the housing whereas the inner surface is in fluid connection with conduit means providing the fluid connection between this inner surface and an area outside of the housing.

In accordance with a second embodiment of this invention an improved fermentation process is provided for. In this process a mixture comprising a nutrient medium and a microorganism is subjected to fermentation conditions. A foam comprising a liquid phase of nutrient medium and cells and a gas phase is generated. The foam is passed through a foam breaking operation wherein the foam is separated into the liquid phase and into the gas phase by passing this foam in contact with a rapidly rotating surfaces. In accordance with this invention this process is improved by using as the surfaces path defining surfaces formed in a foam breaking body by a multitude of elements that are in contact with each other and that are shaped and arranged such as to form a large number of fluid paths between an outer an an inner surface of said body. A pressure gradient is generated between the outer and the inner surface of the body and the outer surface is arranged in contact with the foam. A gas phase is withdrawn from the inner surface. The liquid phase leaves the foam breaking body from at least a portion of the outer surface and is preferably returned into the fermentation step or collected for further processing. If the liquid is tacky or sticks to the surface of the padding material, it is preferred to backflush the foambreaking device periodically and thereby wash of some or all of the materials held by the foambreaking device.

The following details apply both to the apparatus and the process embodiments where feasible.

The individual elements forming the foam breaking body can also be described as a packing material. This packing material can consist of typical packing material as used in for instance distillation columns. Packing materials that can also be used if they are compatible with the fermentation process, are plastic mesh, e.g. mesh material knitted or woven from plastic yarns or other fibrous material, fiberglass reinforced or unreinforced foamed plastic, e.g. foam (open cells) or foam particles (open cells or closed cells, the latter having weight reduction function only, the former constituting additional channels) from such plastics as polystyrene, polytetrafluoroethylene, and polypropylene, metal, glass or ceramic rings (slotted or unslotted) or saddles; mixtures of two or more different kinds of packing materials can be used in a random form of a mixture or in the form of annular rings of packings of various kinds separately. The elements preferably are wire elements which are knitted or woven into wire mesh segments and a plurality of these segments form the foam breaking body. The advantage of the large number of elements used and the thereby created large number of fluid paths contributes to the efficiency of the foam breaking operation in that a larger surface spinning around the rotational axis is provided for along which a foam has to move as compared to the geometrically well defined frustoconically shaped foam breaking surfaces. The foam breaking surfaces of this invention can be also described as multichannel arrangements. The individual paths can be statistically arranged and do not have a geometrically defined pattern.

The shape of the foam breaking body is not particularly critical and can for instance be spherical, cylindrical, or frustoconical. The presently preferred shape of the foam breaking body is a cylindrical shape. The individual elements of the foam breaking body may be confined in a solid casing having openings smaller than the elements which are in contact with the casing. In case of a cylindrically shaped foam breaking body this casing comprises a top portion, a bottom portion and a cylindrical circumferential portion with openings through the cylindrical circumferential portion as well as through at least the outer area of the top and bottom portion of the casing.

The foam breaking body is preferably connected to a conduit having openings therein allowing the withdrawal of gas from the interior of the foam breaking body and the flow of the gas through this conduit into an area outside of the confining housing.

For typical fermentation purposes the surface area of the foam breaking body will be in the range of 1.0 to 25 $in^2/in^3$. Another way of describing the foam breaking body for such fermentation operations is by a number of paths above 500. The size of the paths is best described by an average diameter of such a path of in the range between 0.04 and 1 inches. It should be understood that rotation of the foam breaking body will in effect decrease the average path diameter and increase the number of pathways.

The FIGURE of the drawing shows the upper part of one type of fermentation apparatus. The use of this fermentor type is merely exemplary and should not be interpreted in any way as limiting the structural and functional details of the fermentation apparatus in which the foam breaking device herein described can be used. In a housing 1 a foam is generated in the lower portion which is not shown. This foam rises in the annular shaped space 2 between the cylindrical portion of the housing 1 and a draft tube 3. The foam flows in part back into the draft tube 3 as indicated by arrow 4. The foam containing less fluid and more gas reaches the foam breaking device 5.

The foam breaking device 5 comprises a casing 6 which is composed of a top cover plate 7, a bottom cover plate 8 and a cylindrical confining portion 9. The top cover plate 7, the bottom cover plate 8 and the cylindrical confining section 9 are provided with openings 10 which are large enough to allow the foam to pass through, but not large enough to allow those elements of the foam breaking body 11 that are in contact with this casing to pass through. The casing is attached to a hollow conduit 12 which is supported in the casing by means of a bearing 13. The foam breaking unit 5 can be put into rapid rotation by means of a motor drive unit 14. The conduit 12 is closed at the bottom to prevent any direct flow of foam into this conduit. Openings 15 are provided at the lower end of the conduit 12. The geometrical arrangement of the openings 10 through which the foam enters the foam breaking body 11 and the openings 15 through which gas leaves the foam breaking body 11 are such that the fluid has to migrate through a substantial length of its way along one or more of the paths in the foam breaking body. In other words, the shortest geometrical distance between the openings 10 in plates 7 and 8 into the foam breaking body 11 and any of the openings 15 at the inner surface of the foam breaking body 11 is significant and in the range of about 0.4 to 1.5 of the radial extension of the foam breaking body 11.

Reasonable variations and modifications which will become apparent to those skilled in the art can be made in this invention without departing from the spirit and scope thereof.

I claim:
1. Apparatus useful for breaking foam comprising
 (a) a housing capable of holding foam,
 (b) a foam breaking body comprising
  (aa) a casing
  (bb) within said casing a multitude of elements of packing material, said elements being in contact with each other, said elements being of a structure and said arrangement being such as to leave a multitude of fluid paths in said body, said paths having an average diameter in the range of 0.04 to 1 inch and providing fluid connections between an outer surface and an inner surface of said body, "outer" and "inner" referring to the distance of these surfaces from an axis, said outer surface of said body being in fluid communication with the interior of the housing allowing foam present in this housing to reach the outer surface,
  (cc) openings in said casing allowing the foam to enter through said outer surface and contact said packing material and allowing gas to leave said body through said inner surface,
 (c) means for rotating said body around said axis,
 (d) conduit means providing fluid connection between the inner surface of said body and an area outside of said housing.
2. An apparatus in accordance with claim 1 wherein said elements are wire elements.
3. An apparatus in accordance with claim 2 wherein several of said wire elements are interconnected with each other to form wire mesh segments and wherein said body comprises a plurality of wire mesh segments.
4. Apparatus in accordance with claim 1 wherein said body is essentially cylindrically shaped.
5. Apparatus in accordance with claim 4 wherein said body is arranged for rotation around the cylinder axis.
6. Apparatus in accordance with claim 1 wherein said body is confined in a solid casing having openings smaller than the elements in contact with the casing.
7. Apparatus in accordance with claim 6 wherein said casing comprises a top portion, a bottom portion and a cylindrically shaped circumferential portion.
8. In a fermentation process comprising
 (a) subjecting a mixture comprising a nutrient medium and a microorganism to fermentation conditions,
 (b) generating a foam comprising a liquid phase of nutrient and microorganism cells and a gaseous phase,
 (c) passing said foam to a foam breaking operation thus separating said foam into said liquid phase and said gas phase by passing the foam into contact with rapidly rotating surfaces,
the improvement comprising
using as said surfaces, paths defining surfaces formed in a foam breaking body by a multitude of packing material elements that are in contact with each other and that are shaped and arranged such as to form a large number of fluid paths between an outer and an inner surface of said body, said paths having an average diameter in the range of 0.04 to 1 inch,
generating a pressure gradient between said outer and said inner surfaces of said body thus forcing said foam to move into contact with the outer surface of said rotating body and into said paths, withdrawing said gas phase from the inner surface of said body.

9. Process in accordance with claim 8 comprising reintroducing the liquid phase leaving the outer surface of said foam breaking body into step (a).

10. Process in accordance with claim 8 comprising periodically backwashing said foam breaking body by passing a washing fluid from said inner surface to said outer surface of said foam breaking body.

* * * * *